United States Patent Office 3,775,357
Patented Nov. 27, 1973

3,775,357
FINELY DIVIDED CARBON BLACK MODIFIED UNMASTICATED POLYMERS OF VINYL MONOMERS
Tibor Laszlo Nemeth, Passaic, N.J., assignor to The Pantasote Company of New York, Inc., New York, N.Y.
No Drawing. Continuation of abandoned application Ser. No. 853,203, Aug. 26, 1969. This application June 23, 1972, Ser. No. 265,669
Int. Cl. C09k 3/00; C08f 45/24, 29/18
U.S. Cl. 260—17 A    8 Claims

ABSTRACT OF THE DISCLOSURE

Finely divided particles of unmasticated vinyl resins having carbon black dispersed in the particles thereof and suitable for fluid bed coatings, flame spray coating, preparation of rigid extrusions, and direct pressing into molded articles, such as phonograph records, are produced by suitably incorporating a fine aqueous dispersion of carbon black into a suspension of vinyl monomer, the carbon black dispersing agent and the suspending agent being paired together so that when negatively charged suspensions are used, the carbon black dispersing agent is non-ionic, amphoteric or cationic, and when positively charged suspensions are used, the carbon black dispersing agent is anionic or amphoteric.

---

This application is a continuation of my earlier filed application Ser. No. 853,203, filed Aug. 26, 1969, and now abandoned.

The present invention relates to finely divided, unmasticated vinyl polymers containing carbon black uniformly dispersed therein, a method for producing such finely divided polymer, and articles formed from such polymers. It particularly relates to finely divided black polymers of vinyl chloride which have not been degraded by mastication and which are suitable, with or without any desired subsequent blending with stabilizers or other compounding agents, for direct extrusion into shaped form, for pressing or plunger extrusion into phonograph records of excellent quality, particularly as far as surface noise is concerned, for making molded articles, and for the use in fluid bed applications.

Carbon black greatly improves the resistance of vinyl resins to ultraviolet and other actinic radiation. In this respect it is vastly superior to so called screening compounds that absorb radiation of certain wave lengths. Carbon black has been considered desirable in phonograph records, not only for coloring purposes but to more uniformly distribute electrical charges generated by friction and to improve the rate at which such charges are dissipated.

When carbon black is added to the dry polymer by the usual mastication technique, not only is considerable difficulty had in effecting proper dispersion but mastication at the required elevated temperature effects considerable degradation of the structure of the resin. A fine powder suitable for fluid bed coating of preheated metal articles can only, if at all, be prepared with greatest difficulties from such premasticated mixtures. In the case of phonograph records, any agglomerates in the mixture are sources of noise when the record is used.

When a carbon black dispersion is mixed with a high polymer latex and the mixture coagulated, the black and polymer particles may have different stabilities with the result that upon coagulation small agglomerates of black and small agglomerates of polymer may occur, or agglomerates of varying black and polymer content form. Such agglomerates of black are hardened when the product is dried, and those containing high concentrations of black per unit of polymer may become so hard that they cannot be broken up at all by mastication of the polymer black mixture. The coagulum of black-modified latex is also highly undesirable because the black is not in the polymer particles and is deposited on hands and surfaces with which the material comes into contact. This is particularly the case in polymers coagulated at temperatures below the glass transition point of the polymer. There must be always some mastication of the coagulum to get the black into the polymer particles.

It has been proposed to mix carbon black into the monomers before they are dispersed in the aqueous liquid. Such a process has been found undesirable for various reasons. Carbon black inherently consists largely of agglomerates of particles, and it is much more difficult to break up these carbon black agglomerates when they are in a monomer or organic liquid than when they are in water. Dispersing agents usable in organic liquids are far less effective than those suitable for use in water; and when used they remain in the polymer as contaminants. Also, in the case of highly volatile, low boiling polymers, special equipment must be used to maintain the black and monomer together when the black-monomer mixture is added to the aqueous phase.

It is an object of the present invention to provide a finely divided vinyl resin having carbon black distributed in the particles and which has the resin of the particles in their initial form undeteriorated by mastication of the black into the polymer at the required high temperature where the polymer becomes rubberlike.

It is another object of this invention to provide a method for producing particles of black compounded polymers (including copolymers with any monomer copolymerizable with vinyl chloride) of a vinyl compound, which particles do not soil hands and surfaces with which they may come into contact and which have the molecular structure of polymers which have not been degraded by a mastication procedure.

It is a further object of the present invention to produce in a fine particulate form unmasticated copolymers of vinyl chloride with a copolymerizable vinyl monomer, such as vinyl acetate, vinyl ethers, vinylidene chloride, vinyl fluoride and the like, which copolymers are suitably compounded with a carbon black and of a fineness to permit their use in fluid bed coating methods wherein a hot article is immersed into a suspension of particles of the black resin in a moving mass of gaseous material.

It is a still further object of this invention to provide finely divided, unmasticated suspension copolymers of vinyl chloride with a plasticizing monomer, such as vinyl acetate or vinyl ether, containing carbon black dispersed therein, and suitable for use in fluid bed coating processes and for production of phonograph records and the like.

Other objects will be apparent from the following description of the invention.

I have found that when there is a proper combination of type of carbon black, water-soluble carbon black dispersing agent and water-soluble monomer-suspending agent (protective colloid), an aqueous dispersion of carbon black can be added to a suspension of the monomers before or during the early polymerization thereof, and that the black will flush into the particles so as to be uniformly dispersed in the particles of polymer as they are formed.

Dispersing agents which are highly effective in water are used in accordance with my invention to break up the agglomerates of carbon and disperse the black. Thus, the dispersion is far superior to dispersions obtainable when black is incorporated directly into nonaqueous liquids and reliance is had on organic soluble dispersing agents operable therein.

The particular type (nonionic, anionic, amphoteric or cationic) of dispersing agent for the black to be used for best results depends on the type of suspending agent for the resin, and vice versa. In the case where the water-soluble suspending agent or protective colloid is a high molecular weight material containing a substantial number of hydroxyl groups in the molecules thereof, as exemplified by hydroxymethyl cellulose, hydroxyalkylmethyl cellulose, methyl cellulose, gelatine (at pH of 4.7 or more), polyvinyl alcohol, etc., which usually provide oil-in-water emulsions having negatively charged particles, carbon black dispersions having a water-soluble nonionic or amphoteric dispersing or emulsifying agents are preferably used. Cationic dispersing agents may also be used for preparing the aqueous carbon black dispersions for use with such suspending agents but are less desirable than the nonionic. On the other hand, when the protective colloid used as the suspending agent for the vinyl monomers is one that produces suspended particles of the monomer with a positive charge, as does polyvinyl pyrrolidone, gelatine at a pH well below the isoelectric point of 4.7, and materials having quaternary nitrogen or ammonium groups, then the water-soluble anionic or amphoteric dispersing agents for the carbon black in aqueous liquid give superior results. When aqueous carbon black dispersions containing only nonionic or cationic dispersing agents are used in combination with such positively charged monomer particles, the black does not flush as well and an inferior product is obtained.

In the preparation of products of the present invention, the suspension polymerization technique is used where initiation and the polymerization of the monomers occurs within globules of the vinyl chloride monomer or monomer mixture. While some micelle-producing agents such as water-soluble soaps, alkyl sulfonic acid salts, etc. may be present, and indeed are sometimes desirable, the amount used should preferably be below that amount where appreciable micelles are formed in the aqueous liquid, otherwise new particles may be formed in soap micelles without subsequent pigmentation. The presence of such surface active agents decreases the particle size of the powder as does also greater proportions of the suspending agent. The major suspending agent is a non-micelle forming high molecular weight material generally classed as a protective colloid. These materials are used in amounts of 0.05 to 1% of the weight of the monomer. Larger amounts give smaller particle size powders. Generally about .1 to .3 parts of these protective colloids based on the weight of monomer are used.

The polymerizer used in the production of the pigmented polymers is of a type customary for producing vinyl resins. It is a high pressure-rated vessel having a stainless steel or glass-coated steel lining jacketed for proper temperature control and equipped with agitators, necessary piping for addition and removal of materials and the customary instrumentation.

The amount of water used generally is between 100 parts and 300 parts per 100 parts of monomer. The water is preferably distilled or deionized water of a pH between 5.5 and 7.5. It forms the continuous phase reactor during the polymerisation of the monomers.

In accordance with the preferred procedure in preparing the pigmented polymers or copolymers of the present invention, the suspending agent or agents to be used for suspending the monomers are dissolved in sufficient water to give a clear, gelfree solution.

The solution of the suspending agent plus the desired amount of water is incorporated into the polymerizer and maintained under agitation.

The carbon black dispersion is prepared as aforesaid and incorporated into the aqueous solution in the polymerizer. The oxygen content is reduced to the desired level, in accordance with customary practice, for instance, by flushing the polymerizer with nitrogen or other gas. The remaining ingredients, i.e. the monomers, initiating agents, chain-transfer agents, etc. that are used, are then incorporated into the polymerizer, in whole or in part, and by bringing the contents up to the required temperature, polymerization occurs. The conversion should ordinarily be in excess of 30%, and conversions of 80 or 90% are preferred. The contents of the polymerizer are then removed, the excess monomers stripped, and the solid particles are filtered from the aqueous liquid phase and dried.

The polymerization is initiated by the usual initiating agents, such as organic peroxides. The initiators usually used are one or more of the following: peroxy-dicarbonates, sulfonylacyl peroxides, dialkyl peroxides, diacyl peroxides or any other initiator which may be used for vinyl polymerization. For example, one or more of lauryl peroxide, azo-bis-isobutyronitrile, and diisopropyl peroxydicarbonate (IPP) are frequently used. Other initiating techniques may be employed as well.

A small amount, usually 0 to 5% based on the weight of monomers, of a chain transfer agent such as the chlorinated solvents, which include trichloroethylene, tetrachloromethane, dichloromethane, aromatic chlorine substituted products, is usually added. Other chain transfer agents as employed in vinyl polymerization may be used in place of or in addition to one or more of the above listed chain transfer agents.

Stabilizers such as are used for stabilization of vinyl chloride resins may also be incorporated, either with the monomers, the carbon black dispersion, the chain transfer agent or separately into the polymerizer containing the aqueous liquid. Such stabilizers include the polyvalent metal soaps, such as calcium, magnesium, lead, zinc, tin (both stannic and stannous) of fatty acids, such as oleic, stearic, palmitic, 2-ethylhexanoic acid and the like. Organic phosphites frequently used in combination with such soaps as stabilizers may also be incorporated. The stabilizers may also be predispersed in water, monomer, solvent, chain transfer agent, or mixed with other additives and ingredients prior to incorporation into the aqueous mixture. Which stabilizers to use, if any, depends on the end application.

The carbon black used in preparing the materials of the present invention may be either of the furnace or channel types. However, channel blacks are preferred and provide powders that have somewhat superior properties. The blacks may be pretreated with one or more hydroxyl-reactive organosilanes, one or more organic isocyanates, to produce special surface characteristics. Blacks treated to make them hydrophobic with one or more of the above and/or other materials are often especially desirable. Such surface treatment of the black with unsaturated hydroxyl-reactive organosilanes or unsaturated isocyanates may be used to provide interaction with the monomers during the polymerization thereof. Ordinarily, however, it is unnecessary to use the black which has been rendered hydrophobic with any pretreatment. The blacks used for preparation of powders suitable for use in preparing phonograph records and the like should preferably have a particle size between 10 and 30 millimicrons as measured by the electron microscope, a blackness range expressed in a blackness index of 100 to 200, and a porosity or surface area of about 80 to 800 m.²/g., as measured by nitrogen absorption. Blacks with a particle size greater than 30 millimicrons tend to increase noise in phonograph records but are not too objectionable until particle size is greater than 50 millimicrons. Blacks of particle size up to 150 millimicrons may be used for other purposes although smaller particle size blacks, particle size below 100 millimicrons, provided better properties.

In preparing the carbon black dispersion, the black is preferably wetted by water containing the dispersing agent desired. The mixture may then be suitably ground as by passing the dispersion through a colloid mill, ball mill or the like to deagglomerate the black polymers in the presence of the dispersing agent.

Carbon black dispersing agents preferably used in most instances are of the nonionic type. Examples of such materials are the polyoxyalkylene alkyl esters, the polyoxyalkylene aralkyl esters, the polyoxyalkylene fatty acid esters, such as the laurate and oleate stearates and the like, the ethylene oxide condensates of fatty acid amides and the sorbitan fatty acid esters, such as sorbitan monooleate, monolaurate, monopalmitate and monostearate. The cationic emulsifiers such as polyethoxylated quaternary ammonium salts and others in the below mentioned publication may be used in the present invention when anionic suspensions of the monomer are prepared. The additional suitable nonionic dispersants or emulsifiers together with suitable cationic, amphoteric and anionic dispersing agents are described in the book entitled, "Detergents and Emulsifiers . . . up to date" (1962), by John W. McCutcheon, Inc., 236 Mount Kemble Ave., Morristown, N.J. The number and extent of available anionic, nonionic, amphoteric and cationic emulsifiers may be used in proper combination as aforesaid with suspending agents described above and are almost limitless as shown by the above-mentioned publication.

The amount of carbon black incorporated into the vinyl chloride polymer (the term "polymers" being used in the generic sense to include "copolymers") may be varied widely. The effectiveness of the carbon black depends in substantial measure on the particle size thereof. Smaller particle size and higher surface area blacks are more effective than those of larger particle size. As little as .1% or even .05%, based upon the polymer formed, may be used to obtain such major benefits of the present invention as substantial resistance to ultraviolet radiation. Preferably, substantially more, i.e. approximately 0.2 to 0.7% by weight of monomers charged is used when the product is to be used for the preparation of phonograph records and the like. As much as 1.5% to 2.5% of the weight of the monomers charged may also be used for this purpose. Amounts greater than 4 or 5% of the weight of the polymer are generally undesirable for phonograph records. When however the vinyl resin is to be used for other applications, such as for fluid bed coating of previously heated metal articles and the like, the amount of carbon black may be increased to as much as 10 or 20%, based upon the weight of the polymer formed. However, it is preferable that the amount of the carbon black be always maintained below 5% of the weight of the polymer.

The following examples, in which parts are by weight, illustrate the present invention:

EXAMPLE I

An aqueous dispersion of channel-type carbon black having a particle size of about 25 millimicrons and a porosity of about 150 m.²/g. is prepared by wetting 35 parts of the black with an aqueous solution of 55 parts of water and 10 parts of an alkyl benzyl polyethylene glycol ether. The mixture thus obtained is passed through a colloid mill several times to produce a homogeneous dispersion of the black in water having a solids black content of 35%.

In place of the alkyl benzyl polyethylene glycol ether, an equal amount of water-soluble lecithin may be used with about equivalent results.

The dispersion thus prepared is preserved for subsequent use.

EXAMPLE II

|  | Parts |
|---|---|
| Vinyl chloride | 82.0 |
| Vinyl acetate | 18.0 |
| Initiator | (1) |
| Suspending agent (hydroxypropyl methyl cellulose) | 0.2 |
| Chain transfer agent (trichloroethylene) | 2.5 |
| Stabilizer (dibasic lead stearate) | 0.7 |
| Carbon black dispersion of Example I | 1.45 |
| Water (deionized pH 5.5 to 7.5) | 200.00 |

[1] Sufficient to give the desired reaction conditions.

The water is charged into the polymerizer, and the hydroxypropyl methyl cellulose, which is previously mixed with sufficient water to provide a clear, gelfree solution, is then incorporated into the polymerizer. The designated amount of the carbon black dispersion previously mixed with the stabilizer is added thereto and stirred. .05 parts of IPP initiator dissolved in a solvent, such as toluene, is mixed with the trichlorethylene chain transfer agent and is then incorporated into the polymerizer, which is then fluxed with $N_2$ to eliminate oxygen. The monomers vinyl chloride and vinyl acetate are then added with agitation. The reaction is maintained at a temperature of about 125° to 150° F. under constant agitation until conversion is at least 75% complete, whereupon the ingredients are discharged, the unpolymerized monomers flashed off, and the particles of the resin separated from the liquid and dried at any suitable temperature below their glass transition temperature so that the particles remain free-flowing.

In the above example, the order of the addition of ingredients may be made in any manner as is well-known. The vinyl chloride may account for 50 to 100% of the monomer mixture; the vinyl acetate may account for 0 to 50% of the monomer mixture or other comonomers may be substituted in whole or in part therefor. The amount of stabilizer may be varied from 0 to 3%; the chain transfer agent may be varied from 0 to 5 or 6%; the suspending agent may generally be varied from .1 to 1%; and the amount of black may be varied from .01 to 10%, all percentages being based on the total weight of the monomers used.

EXAMPLE III 228 grams of a very fine particle size channel black having an average particle size of approximately 30 millimicrons are dispersed in 760 grams of a 12% solution of polyoxyethylene fatty acid ester, which is a nonionic dispersing agent. 363 grams of tribasic lead phosphite were dispersed into the carbon black thus prepared. A fifty-gallon reactor equipped for agitation is charged with 190 lbs. of water (pH of 6.0) and 90.8 grams methocel-90HG35 as a 5% water solution, the above carbon black dispersion, 385.0 grams lauroyl peroxide, 45.4 grams azo-bis-isobutyronitrile, 33.8 grams ammonium bicarbonate, and 681.0 grams trichloroethylene. The reactor is closed, the contents are agitated, and the air is removed. Eighty-two (82) pounds of vinyl chloride and 18 pounds of vinyl acetate are then added. The temperature of the reactor contents is increased to 138° F., and the contents are kept at this temperature under constant agitation until the reaction pressure drops to 20 p.s.i.g. The polymer is removed, dried, and used for pressing into phonograph records. The particles obtained are all free-flowing, small, round and of uniform black content throughout.

For phonograph record application, the polymer produced should contain from 80 to 92% combined vinyl chloride and from 20 to 8% of combined vinyl acetate as measured by the infrared method. The particle size of the powdery product produced is between 70 and 200 microns, preferably between 120 and 170 microns. The copolymer for phonograph records preferably has a solution viscosity of 0.2 as measured in cyclohexanone, 0.4 gram per 100 ml. at 25° C.

The copolymers produced in accordance with the present invention have excellent heat stability. Heat stability is measured by placing 100 grams of the polymer on a six-inch two-roll laboratory mill having roll space to provide the usual rotating bank and heated at 280° F. If the polymer can be milled for twenty minutes and does not stick to the mill, heat-stability is sufficient. They also have fusion properties which permit the particles of polymer to be pressed directly into phonograph records of good quality. Additional compounding ingredients may be mixed with the polymer particles either in the dry or fused state to prepare homogeneous compounds which can be immediately extruded, pressed into records, or injection molded into desired articles. A mass of the particles with or without further dry compounding with liquids or suitable other materials may also be floated on moving streams of air or gas in the fluid bed process and used for coating heated metal, which is simply passed through the fluid bed and coated by fusion of the particles which impinge on the heated metal.

The unmasticated polymers of vinyl chloride prepared in accordance with the present invention with the black dispersed in particles permit production of articles of such exceptional stability to ultraviolet radiation that they may be used permanently on the outside of buildings without appreciable deterioration. Rigid PVC extrusions suitable for window frames, casings and the like are especially desirable as are also sidings which consist entirely of the black material or black material adhered to a metal base. The rapid fusibility of the fine particles also permits the spray coating of heated surfaces without the use of solvent or liquid and even the flame or sputter spray coating method may be used.

Carbon black provides greater superiority for outside applications and for phonograph records. The polymers produced by the present invention appear to have the carbon black embedded in the particles but concentrated more largely about the outer surfaces thereof. When the particles are pressed together, there is therefore a greater electrical conductivity per unit of black present than when carbon black is simply dispersed uniformly into the resin by a mastication procedure. This superior conductivity in the case of phonograph records is advantageous in reducing static charges and decreasing accumulation of dust.

It is also apparent that in accordance with the provisions of the patent statutes modifications of the invention may be made without changing the spirit thereof.

Having described my invention, I claim:

1. In a method for the suspension polymerization of vinyl chloride, wherein a mixture of a monomer charge containing 50 to 100% of vinyl chloride and 0 to 50% of a copolymerizable monomer selected from the group consisting of vinyl acetate and a vinyl alkyl ether, based on the total monomer charge, a water-soluble organic suspending agent, water, and an initiator of polymerization is agitated until the desired conversion to polymer occurs, and polymer particles thus formed are separated from liquids, the improvement which comprises incorporating carbon black and a water-soluble dispersing agent in said mixture; said dispersing agent being present in an amount effective to disperse the carbon black, said carbon black being present in an amount to provide from 0.05% to 20% by weight of the polymer formed and said suspending agent being present in an amount of from about 0.05% to about 1% by weight of the monomer charge.

2. The method of claim 1, wherein said suspending agent is a high molecular weight organic material, containing a plurality of hydroxyl groups in the molecules thereof, said dispersing agent is a water-soluble non-ionic dispersing agent, and said carbon black is selected from the group consisting of furnace and channel-type blacks.

3. The method of claim 1, wherein the amount of carbon black is selected to provide 0.1 to 2.5% of carbon black by weight of the polymer formed.

4. The method of claim 1, wherein said carbon black is a channel type of carbon black having a particle size of 10 to 50 millimicrons and having a porosity as determined by nitrogen absorption of 80 to 300 sq. meters per gram.

5. The method of claim 3, wherein the monomer charge comprises vinyl chloride and vinyl acetate, combined vinyl acetate makes up 8 to 20% of the weight of said polymer and combined vinyl chloride makes up 80 to 92% by weight of said polymer.

6. The method of claim 1, wherein said monomer charge comprises vinyl chloride and at least one vinyl alkyl ether.

7. The method of claim 1, wherein the polymerization is carried out to form polymer particles of 70 to 200 microns.

8. The method of claim 1, wherein said mixture includes a stabilizer.

References Cited
UNITED STATES PATENTS

| | | | |
|---|---|---|---|
| 2,997,451 | 8/1961 | Miller | 260—41 R |
| 3,326,848 | 6/1967 | Clemens et al. | 260—41 R |
| 3,393,165 | 7/1968 | Evans et al. | 260—34.2 |
| 3,449,291 | 6/1969 | Lerman et al. | 260—41 R |

FOREIGN PATENTS 856,527 12/1960 Great Britain.

U.S. Cl. X.R.

106—37, 193 J, 307; 260—8, 29.6 F, 29.6 MN, 29.6 MQ, 29.6 RW, 29.6 WA, 34.2, 41 R, 92.8 W